United States Patent [19]
Turner

[11] 3,969,232
[45] July 13, 1976

[54] BEARING AND BEARING LINER WEAR RESISTANT COMPLIANT LAYER

[75] Inventor: Peter H. Turner, Burbank, Calif.

[73] Assignee: Sargent Industries, Inc., Los Angeles, Calif.

[22] Filed: Jan. 25, 1974

[21] Appl. No.: 436,651

[52] U.S. Cl.................... 252/12.6; 252/12; 252/12.4; 308/72; 308/238
[51] Int. Cl.²............ C10M 5/00; C10M 7/00; F16C 9/06; F16C 27/00
[58] Field of Search................ 252/12, 12.2, 12.4, 252/12.6; 308/72, 238

[56] References Cited
UNITED STATES PATENTS

| | | | |
|---|---|---|---|
| 2,322,771 | 6/1943 | Palm et al. | 252/12.2 |
| 3,380,843 | 4/1968 | Davis | 252/12.2 |
| 3,455,864 | 7/1969 | Dodson | 252/12.4 |
| 3,508,945 | 4/1970 | Halmer et al. | 252/12.2 |
| 3,594,049 | 7/1971 | Turner | 308/238 |

Primary Examiner—Delbert E. Gantz
Assistant Examiner—I. Vaughn
Attorney, Agent, or Firm—Ellsworth R. Roston

[57] ABSTRACT

A bearing liner for attachment to a substrate comprising a first wear resistant layer and a second wear resistant layer joined to the first wear resistant layer. The second wear resistant layer serves to increase the useful life of the bearing liner. In addition, the second wear resistant layer serves as a compliant layer for receiving any projections in the substrate so that the tendency of any such projections to cause local protrusions of the wear surface of the first wear resistant layer is reduced.

27 Claims, 5 Drawing Figures

BEARING AND BEARING LINER WEAR RESISTANT COMPLIANT LAYER

BACKGROUND OF THE INVENTION

A bearing liner is utilized between relatively movable members to provide a low friction, wear resistant surface. Relative movement between the members inherently results in wear of the bearing liner and consequent reduction in its thickness. When the bearing liner has been thinned a predetermined amount, the bearing liner must be replaced.

The wear rate is the amount of wear or thinning of the bearing liner per cycle of movement between the relatively movable members. It is obviously desirable to reduce the wear rate to thereby increase the life of a bearing liner.

Typically, a bearing liner is adhered to a substrate. The substrate is not highly polished and has numerous minute projections. For example, these projections may have a maximum height of the order of .003 inch above the mean surface elevation of the substrate, i.e., the surface elevation of the substrate which has one-half of the substrate surface lying above it and one-half of the substrate surface lying below it. The bearing liner has a wear surface which is adapted to engage and slidably support another member which is movable relative to the substrate. In use, the bearing liner is compressively loaded between the substrate and this member.

Bearing liners of the type to which this invention is directed are thin and deformable. Accordingly, loading of the bearing liner against the substrate causes the projections of the substrate to locally deform the bearing liner and provide protrusions on the wear surface. In other words, under load, the relatively thin bearing liner tends to assume the configuration of the irregular surface of the underlying substrate.

As a consequence, the wear surface becomes irregular and includes numerous protrusions formed by the projections on the substrate. Initially, the member engaging the wear surface is supported substantially entirely by the relatively small area of the protrusions, and this results in very rapid initial wear, i.e., a high wear rate. The high initial wear rate continues until all of the protrusions have been worn off so that the wear surface presents a smooth, regular contour. This high initial wear rate materially reduces bearing liner life.

Common assignee's copending application Ser. No. 436,670 filed concurrently herewith in the name of Alfred J. Capelli and entitled "Bearing and Bearing Liner Having A Compliant Layer" provides one solution to this problem. In application Ser. No. 436,670 referred to above, there is disclosed a bearing liner in which a compliant layer is provided between the substrate and the wear resistant portion of the bearing liner. The compliant layer isolates and protects the wear resistant portion from the irregular surface of the substrate, and accordingly, the tendency of the projections on the substrate to produce protrusions on the wear resistant portion of the bearing liner is substantially reduced or eliminated. By reducing the size and number of the protrusions on the wear resistant portion, the high initial wear rate which conventional bearing liners experience is substantially reduced.

SUMMARY OF THE INVENTION

The present invention increases the useful life of a bearing liner by employing an appropriate wear resistant layer as the compliant layer. The compliant charactertistic of this layer reduces the high initial wear rate, and the wear resistant nature of this layer increases substantially the total wear which the bearing liner can undergo.

Surprisingly, certain wear resistant bearing liner materials also have the necessary properties to serve as a compliant layer to reduce the initial wear rate. Accordingly, a preferred bearing liner of this invention includes two or more wear resistant layers.

The use of two wear resistant layers, quite unexpectedly, significantly more than doubles the total wear which the bearing liner can undergo and also more than doubles the useful life of the bearing. One reason for this is that the second or underlying wear resistant layer cooperates with the first wear resistant layer in a novel way to increase the wear obtainable from the first wear resistant layer. Another reason is that the second wear resistant layer has substantially no high initial wear rate.

These principles can be illustrated, by way of example, by considering the bearing liner described in common assignee's U.S. Pat. No. 3,594,049. The bearing liner disclosed in this patent includes a low friction layer, a fabric backing member, and an adhesive layer for bonding the bearing liner to a substrate. The low friction layer includes lubricant particles dispersed in the binder. Assuming that the low friction layer, the backing member and the bearing liner have thicknesses of 0.003 inch, 0.006 inch, and 0.010 inch, respectively, the patented bearing liner will normally undergo from 0.006 to 0.007 inch of wear before wear becomes so extremely rapid that it must be replaced. Thus, 0.006 to 0.007 inch of the total thickness of 0.010 of the bearing liner is useful to resist wear. This portion is represented by the low friction layer and by three or four thousandths of the fabric backing. The entire thickness of the fabric backing is not useful to resist wear for two reasons. First, the entire thickness of the fabric backing is not completely impregnated with lubricant and, therefore, after a predetermined portion of the fabric backing has been worn away, friction becomes relatively high. Second, with approximately one-half of the thickness of the fabric worn away, the fabric is no longer sufficiently strong to withstand the stresses normally encountered.

However, with the present invention, the first wear resistant layer is "backed up" by a second wear resistant layer. Specifically, the fabric backing member of the first wear resistant layer is sandwiched between, and is in intimate contact with, the low friction layers of the two wear resistant layers. Accordingly, the fabric layer of the first wear resistant layer is more completely impregnated with lubricant particles. In addition, the fabric backing member of the second wear resistant layer imparts some strength to the first wear resistant layer. The result is that the first wear resistant layer functions in a wear resistant manner for its full thickness rather than for only 60 or 70 percent of its thickness as is true in the prior art.

In addition, the second wear resistant layer does not have a period of high initial wear even though it is bonded directly to the substrate. To the extent that the second wear resistant layer tends to contain the irregularities of the underlying substrate, these irregularities are smoothed out by portions of the first wear resistant layer. Accordingly, the second wear resistant layer does not experience high initial wear. The absence of high initial wear in the second layer and the utilization of the full thickness of the first wear resistant layer cooperate to more than double the total wear obtainable from the bearing liner of this invention.

From the standpoint of compliancy, the second wear resistant layer reduces, in two ways, the tendency of the irregular substrate to form protrusions on the wear surface of the first wear resistant layer. First, merely interposing the second wear resistant layer between the relatively rough substrate and the first wear resistant layer of the bearing liner reduces the transmission of any irregularity in the surface of the substrate to the wear surface. In other words, the second wear resistant layer acts as a pad or protector between the relatively rough substrate surface and the wear surface to keep the wear surface relatively smooth. Secondly, the second wear resistant layer deforms under load so that any irregularities in the wear surface are eliminated or further reduced when the bearing liner is supporting a load.

In order to function in either of the ways identified above, the second wear resistant layer must be deformable so that it can at least partially receive any projection on the substrate. In addition, in order to perform the second of the above-noted functions, the second wear resistant layer should be resiliently deformable, i.e., have a spring rate. By providing the second wear resistant layer with a resiliently deformable characteristic, the second wear resistant layer will flow laterally to even out any surface irregularities in the wear surface when it is loaded against a projection. For example, the material of the second wear resistant layer may flow laterally of a projection to produce local thinning at such projection. This enables the second wear resistant layer to more effectively isolate the wear surface of the first wear resistant layer from the projection.

The compressive modulus of the second wear resistant layer may be selected for each specific application. However, the compressive modulus should not be so low that the rated load carrying ability of the bearing liner is reduced. On the other hand, the second wear resistant layer must be sufficiently deformable to adequately receive the projections of the substrate at a psi load level below the psi rating of the bearing liner. A preferred range of compressive modulus is from 100,000 psi to 400,000 psi.

The ultimate compressive strength of the second wear resistant layer should be no less than the load capacity of the bearing liner. If it is not, the load capacity of the bearing liner will be limited by the second wear resistant layer.

The second wear resistant layer should preferably be as thick as the height of the tallest projection which would be expected to be encountered. Preferably, the thickness of the second wear resistant layer should be 1½ to 2 times the height of the projections above the mean surface elevation of the substrate. For many applications, the second wear resistant layer should be at least 0.005 inch thick. The thickness of the second wear resistant layer should not be so great that the total deflection thereof under normal operating conditions results in the bearing liner losing its rated load carrying ability.

Not all bearings or bearing liners require protection of the type afforded by the present invention. Thus, hard, rigid metal bearings do not require protection from projections on the substrate on which they are mounted because the projections are incapable of forming protrusions on the wear surface of such rigid metal bearings. Similarly, a bearing liner which is cast in situ would not require a compliant layer. However, bearing liners which are subject to being deformed by the projections of the substrate if applied directly to the substrate can advantageously use a compliant layer. For example, relatively thin bearing liners of the type which include a binder, a lubricant distributed in the binder, and a fibrous material for increasing the strength of the bearing liner do require the protection provided by this invention in order to minimize or eliminate high initial wear.

Although more than two wear resistant layers can be combined, ordinarily two layers will be adequate. The advantageous results obtainable with this invention cannot be obtained by simply increasing the thickness of a single wear resistant layer. Although each of the wear resistant layers may be of a different construction, ordinarily construction can be simplified if each of the wear resistant layers is of basically the same construction. In a preferred construction, the fibrous material of each of the wear resistant layers is spaced apart by the lubricant and binder of the second wear resistant layer.

The invention can best be understood by reference to the following description taken in connection with the accompanying illustrative drawing.

DESCRIPTION OF THE PREFERRED EMBODIMENTS

Figure 1:
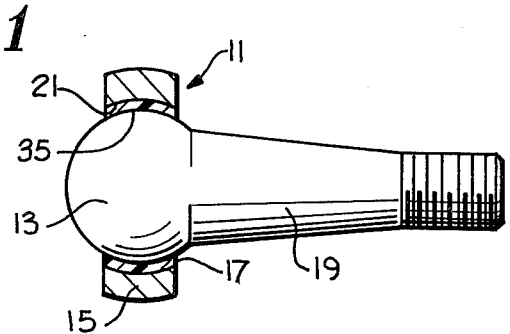
FIG. 1 is an elevational view partially in section of a bearing having a bearing liner constructed in accordance with the teachings of this invention embodied therein.

FIG. 1 shows a bearing 11 which includes a ball 13, a race 15, and a bearing liner 17 interposed between the ball and race. The ball 13 is substantially spherical and has a rod 19 affixed thereto for the purpose of attaching the ball to external structure (not shown).

The race 15 may be attached to other external structure (not shown) in any suitable manner. The race 15 has an internal spherical surface 21 to which the bearing liner 17 is bonded. Thus, the race 17 serves as a substrate for the bearing liner 17. The bearing liner 17 has an internal wear surface 35 of spherical configuration which slidably cooperates with the ball 13. In this manner, the ball 13 and the race 15 are mounted for relative pivotal movement about an infinite number of axes. Although the bearing liner 17 is illustrated in FIG.

1 as being utilized between the ball 13 and the race 15, it should be understood that the bearing liner 17 may be used in other kinds of bearings.

Figure 2:
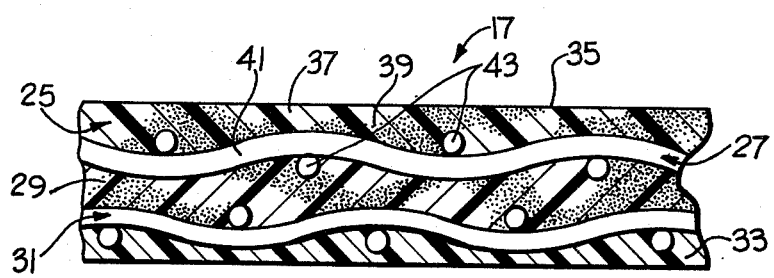
FIG. 2 is an enlarged, fragmentary sectional view through one form of bearing liner constructed in accordance with the teachings of this invention.

One form of the bearing liner 17 is shown in FIG. 2. The bearing liner 17 includes a low friction layer 25, fibrous material in the form of a fabric backing member 27, a second low friction layer 29, fibrous material in the form of a second fabric backing member 31, and a thin layer of adhesive 33. These layers are all coextensive and the section shown in FIG. 2 is typical. In the embodiment shown in FIG. 2, the low friction layer 25 and the backing member 27 constitute a first wear resistant layer and the second low friction layer 29 and the second backing member 31 constitute a second wear resistant layer.

The low friction layer 25 defines the wear surface 35. The low friction layer 25 includes a binder 37 and lubricant particles 39 evenly distributed throughout the binder 37. The binder 37 must be constructed of a material which is capable of binding or holding the lubricant particles 39 together. For example, a phenolic base, thermosetting, two-stage adhesive which provides a strong chemical bond may be employed as the binder 37.

The lubricant particles 37 may include any self-lubricating material which can be embodied in powdered form or any liquid lubricant which is suitable for microencapsulation in accordance with common assignee's copending application Ser. No. 403,453, entitled Bearing Material With Microencapsulated Lubricant, filed on Oct. 4, 1973, and naming Alfred J. Capelli as the inventor. Examples of self-lubricating material include polytetrafluoroethylene (commonly designated by the trademark "Teflon"), fluoroethylene propylene, polyethylene, graphite, molybdenum disulfide, Nylon and Dacron. The lubricant particles 39 should be finely divided and may be, for example, 5 micron Teflon pure powder. Application Ser. No. 403,453 also discloses suitable backing members and suitable binders.

Although the backing member 27 may take different forms, in the embodiment illustrated in FIG. 2, it is in the form of a woven cloth and may be constructed, for example, of Dacron or Nylon. The backing member 27 includes warp strands 41 (only one being illustrated) and a plurality of filler strands 43 interwoven with the warp strands. The primary functions of the backing member 27 are to impart strength to the bearing liner 17 and to provide an irregular or porous surface to which the low friction layer 25 can be applied.

Although the low friction layer 29 may take various forms, in the embodiment illustrated, it is identical, as to composition, with the low friction layer 25. It has a wear surface which is contiguous and underlies the backing member 27. Similarly, the backing member 31 may take different forms; however, in the embodiment illustrated, it is identical to the backing member 27. The adhesive layer 33 is preferably constructed of the same material as the binder 37. The adhesive layer 33 provides some support for the backing member 31 and bonds the bearing liner to the race 15.

The low friction layers 25 and 29, the backing members 27 and 31, and the adhesive layer 33 can be constructed in accordance with the corresponding components illustrated in common assignee's U.S. Pat. No. 3,594,049.

To maximize wear life, the thickness of the low friction layer 25 should be between 0.0025 and 0.0035 inch with 0.003 inch being considered optimum. The thickness of the low friction layer 25 is measured from the peaks of the projections formed on the backing member 27 to the wear surface 35. By way of example, and not by way of limitation, the thicknesses of each of the backing members 27 and 31 may be about 0.006 inch. The backing members 27 and 31 are parallel and spaced apart by the low friction layer 29 which may have a thickness of the order of 0.004 inch. This thickness is preferred for a minimum wear rate. The adhesive layer 33 may be extremely thin and may be, for example, from 0.0005 to 0.001 inch thick.

Figure 3:
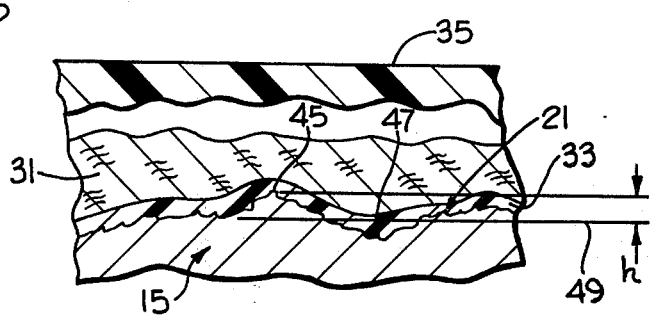
FIG. 3 is an enlarged, fragmentary sectional view illustrating how the wear resistant compliant layer deforms under load to accommodate the projections of the substrate.

The internal surface 21 of the race 15 is not highly polished. Consequently, the internal surface 21 is irregular and includes numerous projections 45 and valleys 47 (FIG. 3). Each of the projections 45 (only one being shown in FIG. 3) has a height h above the mean surface elevation 49 of the surface 21.

One important purpose of the second wear resistant layer is to serve as a compliant layer and more specifically to isolate the other portions of the bearing liner 17 from the irregularities of the surface 21 and in particular the projections 45. In the embodiment shown in FIG. 2, the low friction layer 29, the backing member 31, and the adhesive layer 33 serve to protect the low friction layer 25 and in particular the wear surface 35 from the irregularities in the surface 21. If the first wear resistant layer were applied directly to the irregular surface 21 of the race 15, the wear surface 35 would tend to assume, to some degree, the irregular configuration of the surface 21. However, because the second wear resistant layer is interposed between the first wear resistant layer and the surface 21, the wear surface 35 is substantially smooth.

Merely interposing the second wear resistant layer between the wear surface 35 and the surface 31 tends to reduce the transmission of the irregularities of the surface 21 to the wear surface 35. In addition, when a load is applied to the wear surface 35, the second wear resistant layer is compressed between the surface 21 and the ball 13. If the wear surface 35 contains any irregularities, whether as a result of the projections 45 and the recesses 47 or from other causes, the second wear resistant layer resiliently deforms to allow any irregularities on the wear surface 35 to be smoothed out. Specifically, the material of the second wear resistant layer flows or spreads laterally of each of the projections 45. Because of this lateral flow, the second wear resistant layer thins locally at each of the projections 45 and as a result the wear surface 35 is much smoother and flatter than the irregular surface 21. Accordingly, under load, the projections 45 do not cause protrusions on the wear surface 35 and the recesses 47 do not produce recesses in the wear surface 33.

As the wear surface 35 is smooth from the outset, the high initial wear characteristically experienced with bearing liners is substantially reduced. The reason is that the load applied to the bearing liner 17 by the ball 13 can be carried by substantially the full area of the wear surface 35 rather than by the protrusions which would ordinarily be formed by the projections 45.

Another important effect of the second wear resistant layer is that it acts in two ways to increase the total wear which the bearing liner can undergo. First, the second wear resistant layer allows the full thickness of the first wear resistant layer to be effectively utilized in resisting wear. One reason is that the fabric backing member 27 is sandwiched between the low friction layers 25 and 29, and accordingly the backing member 27 is completely impregnated with a binder and lubricant particle mixture. Thus, adequate lubrication is available throughout the full thickness of the fabric backing member 27. In addition, the fabric backing member 31 serves to support the inner regions of the first wear resistant layer as the fabric backing member 27 is worn away. The net effect is that the full thickness of the first wear resistant layer is operative as a strong wear resistant region of the bearing liner.

Secondly, the second wear resistant layer further increases total wear of the bearing liner 17 by serving as a wear resistant layer once the first wear resistant layer is completely worn away.

Figure 4:
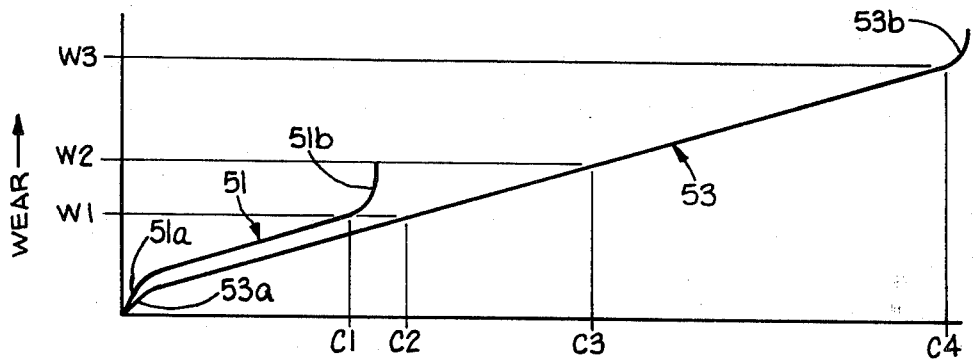
FIG. 4 is a plot of typical wear rates for a prior art bearing liner and the bearing liner of this invention.

The effects of reducing initial wear and of increasing the wear life of the bearing liner 17 are illustrated graphically in FIG. 4. FIG. 4 is a plot of wear or thinning in inches versus the number of cycles of movement to which the bearing liner is subjected. A curve 51 is representative of a prior art bearing liner which does not have dual wear resistant layers or a compliant layer, and a curve 53 is representative of the wear rate of the bearing liner 17 shown in FIG. 2. The curves 51 and 53 have high wear regions 51a and 53a, respectively; however, the initial wear rate of the region 51a substantially exceeds the initial wear rate represented by the region 53a.

The wear W1 graphically represents the total wear obtainable from a prior art bearing liner. Thus, after wearing the amount W1, the prior art bearing liner wear rate becomes extremely rapid as shown by a steep slope region 51b (FIG. 4) and must be immediately replaced. The wear W1 is approximately the amount of thinning necessary to wear through the first low friction layer and approximately one-half of the thickness of the first backing member 27.

With the prior art bearing liner as represented by the curve 51, the wear W1 is reached in C1 cycles. However, with the bearing liner 17 of the present invention as represented by the curve 53, the wear W1 is reached in C2 cycles. Thus, the bearing liner of this invention can withstand C2 minus C1 more cycles of wear than the prior art bearing liner before reaching the wear W1. This advantage is the result of using a compliant layer to make the wear surface 35 more smooth.

The wear W2 represents the amount of wear necessary to wear completely through the first wear resistant layer, i.e., completely through the low friction layer 25 and the first backing member 27. With the prior art bearing liner represented by the curve 51, the wear between W1 and W2 occurs so rapidly that the portion of the prior art bearing liner represented thereby cannot be utilized. However, with the present invention, because the backing member 27 is in intimate contact with both of the low friction layers 25 and 29 and because the backing member 31 imparts additional strength to the bearing liner 17, the wear rate through the backing member 27 remains substantially constant as illustrated by the curve 53. As a consequence, the thickness represented by W2 minus W1 in FIG. 4 is useful to resist wear. With the bearing liner 17, the wear W2 is reached in C3 cycles. Accordingly, C3 minus C2 cycles of useful bearing life is added to the bearing liner as a result of being able to fully utilize 100% of the thickness of the first wear resistant layer.

After the first wear resistant layer is completely worn through, the second wear resistant layer becomes directly subject to wear. The portion of the curve 53 between W2 and W3 represents the wearing away of the second wear resistant layer, i.e., the low friction layer 29 and approximately one-half the thickness of the backing member 31. The wear W3 minus W2 is approximately equal to the wear W1. However, because the second wear resistant layer is not subject to high initial wear, the slope of the curve 53 remains substantially constant between W2 and W3. As a result, the second wear resistant layer can accommodate more cycles of wear in wearing down through approximately one-half of the backing member 31 than the first wear resistant layer in wearing through approximately one-half of the backing member 27. As represented graphically, C4 minus C3 is greater than C1 or C2.

After approximately one-half of the backing member 31 is worn away, the bearing liner 17 wears very rapidly as shown by a steep slope region 53b which corresponds to the region 51b. Thus, W3 represents the total allowable wear of the bearing liner 17 and C4 represents the maximum useful life of the bearing liner 17.

It is important to note that W3 is greater than two times W1 and that C4 is greater than 2 times C1. In other words the addition of the second wear resistant layer more than doubles the total allowable wear and also more than doubles the useful life of the bearing liner.

Figure 5:
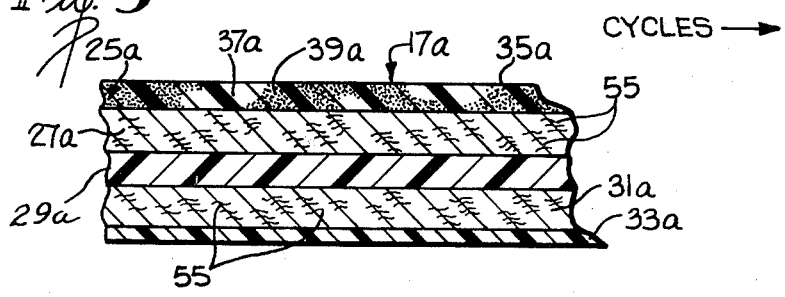
FIG. 5 is an enlarged, fragmentary section view similar to FIG. 2 illustrating a second form of bearing liner constructed in accordance with the teachings of this invention.

The construction of the two wear resistant layers of the bearing liner 17 is not limited to the configuration shown in FIG. 2. FIG. 5 illustrates by way of example another bearing liner 17a constructed in accordance with the teachings of this invention. Portions of the bearing liner 17a corresponding to portions of the bearing liner 17 are designated by corresponding reference numerals followed by the letter a. One advantage of the embodiment of FIG. 5 is that the stress-strain characteristics of the bearing liner 17a are more nearly linear than with the embodiment of FIG. 2.

The bearing liner 17a is identical to the bearing liner 17 except that the backing member 27a is composed of randomly oriented fibers 55 matted together to form a fibrous mat such as paper. The backing member 27a is preferably compressed to reduce its porosity. The fibers 55 can take different forms although compressed vegetable fibers commonly available in the form of paper are particularly advantageous and economical. Calendered paper and rice paper contain highly compressed fibers and are desirable for this purpose. The backing member 27a can comprise one or more layers or paper. More specifically, the backing member 27a can be constructed in accordance with common assignee's copending application Ser. No. 274,606, filed July 24, 1972, entitled "Bearing Liner", and naming Peter H. Turner as the inventor.

The bearing liner 17a may be substituted for the bearing liner 17 in the construction shown in FIG. 1. Like the bearing liner 17, the bearing liner 17a can also be employed in bearing structures other than that illustrated in FIG. 1. When incorporated into a bearing structure, the bearing liner 17a functions in the same manner as the bearing liner 17.

Although exemplary embodiments of this invention have been shown and described, many changes, modifications and substitutions may be made by those with ordinary skill in the art without necessarily departing from the spirit and scope of this invention.

I claim:

1. A bearing liner for attachment to a substrate having at least one projection thereon, said bearing liner comprising:
   a first wear resistant layer, said first wear resistant layer having a wear surface;
   said first wear resistant layer being deformable under load whereby application of said wear resistant layer directly to said substrate would cause the projections to cause a protrusion on the wear surface, the first wear resistant layer including a first porous backing member and an adhesive and a first plurality of particles intimately mixed with the adhesive and providing a low friction and having a sufficiently small size to be mechanically bonded in the pores of the first backing member, the particles being mechanically bonded within the pores of the backing member and being chemically bonded by the adhesive;
   a compliant layer disposed between the first wear resistant layer and the substrate, said compliant layer being deformable to permit the compliant layer to at least partially receive the projection whereby the tendency of the projection to cause the protrusion is reduced; and
   said compliant layer having a second wear surface, said first wear resistant layer covering said second wear surface until said first wear resistant layer is worn away to expose the second wear surface, the second compliant layer including a second porous backing member and an adhesive and a second plurality of particles intimately mixed with the adhesive and providing a low friction and having a sufficiently small size to be mechanically bonded in the pores of the second backing member, the particles being mechanically bonded within the pores of the backing member and being chemically bonded in the adhesive.

2. A bearing liner as defined in claim 1 wherein the adhesive is mixed in the first backing member with the particles in the first plurality in a ratio wherein the particles constitute approximately twenty percent to thirty-five percent by weight in the mixture including the adhesive and the adhesive is mixed in the second backing member with the particles in the second plurality in a ratio wherein the particles constitute approximately twenty percent to thirty-five percent by weight in the mixture including the adhesive.

3. In a bearing including a substrate having an irregular surface,
   a first thin wear resistant layer having a first wear surface wherein the first wear resistant layer is of the type which would be deformed by the irregular surface of the substrate upon loading of the first wear resistant layer against the irregular surface, the first wear resistant layer including a first porous backing member and a first plurality of particles of a low friction material mechanically bonded in the pores of the backing member and mixed with an adhesive having properties of chemically bonding the particles,
   a thin compliant layer attached to the first wear resistant layer at the surface removed from the first wear surface, said compliant layer being resiliently deformable and having properties of reducing the transmission of the irregularities of said irregular surface to the first wear surface; and
   said compliant layer having a second wear surface whereby the compliant layer also serves to extend the useful life of the bearing, the second wear surface being disposed in contiguous relationship to the first wear resistant layer, the compliant layer including a second porous backing member and a second adhesive facilitating the attachment of the compliant layer to the first wear resistant layer and a second plurality of particles of a low friction material mechanically bonded in the pores of the second backing member and intimately mixed with the second adhesive and the second adhesive having properties of chemically bonding the particles in the second plurality.

4. In a bearing as defined in claim 3 wherein said backing in said first wear resistant material constitutes a fibrous material and said backing in said compliant layer constitutes a fibrous material.

5. In a bearing as defined in claim 4 wherein said fibrous material includes a fabric layer having first and second generally oppositely directed faces, at least some of the adhesive and the low friction particles in the second plurality being applied to said first face and being contiguous the first wear resistant layer and wherein the particles of low friction material in the first wear resistant layer and the compliant layer constitute polytetrafluoroethylene with a particle size of approximately five (5) microns.

6. A bearing liner for attachment to a substrate having a projection thereon, said bearing liner comprising:
   a first thin wear resistant layer having a thickness of a few thousandths of an inch and including a binder, a lubricant distributed in said binder, and a porous material having fibrous properties for increasing the strength of said first wear resistant layer, the lubricant being mechanically locked in the pores of the fibrous material and being chemically bonded by the binder, said first wear resistant layer having a first wear surface;
   a compliant layer disposed disposable the first wear resistant layer and the substrate in fixed relationship to the substrate and the first wear resistant layer, said compliant layer being deformable to permit said compliant layer to at least partially receive any projections in the substrate whereby the tendency of any such projections to cause local protrusions of the wear surface is reduced; and
   said compliant layer having a thickness of a few thousandths of an inch and having a second wear surface adjacent the first wear resistant layer whereby the compliant layer also serves to extend the useful life of the bearing liner, the second wear resistant layer including a binder facilitating the disposition of the compliant layer in fixed relationship with the first wear resistant layer, a lubricant distributed in said binder and a porous material having fibrous properties for increasing the strength of said second wear resistant layer, the lubricant being mechanically locked in the pores of the fibrous material and being chemically bonded by the binder.

7. A bearing liner as defined in claim 6 wherein said lubricant in said compliant layer is mechanically bonded in the pores of the fibrous material in the first wear resistant layer and constitutes polytetrafluoroethylene with a particle size of approximately five microns.

8. A bearing liner comprising:
   a plurality of thin wear resistant layers adhered to one another;
   each of said wear resistant layers having a thickness in the order of a few thousandth of an inch and including a binder, particles of a lubricant intimately distributed in said binder, and a layer of a porous material for increasing the strength of the bearing liner, one of said wear resistant layers having a first wear surface which is exposed for initial wear, the lubricant in each of the wear resistant layers being mechanically bonded in the pores of the porous material in that layer and being chemically bonded by the binder.

9. A bearing liner as defined in claim 8 wherein the layer of porous material of each wear resistant layer mechanically bonds the lubricant in that wear resistant layer and the lubricant in the next wear resistant layer.

10. A bearing liner as defined in claim 9 wherein the porous material in at least one of said wear resistant layers includes a woven fabric.

11. A bearing liner as set forth in claim 2 wherein the first backing member constitutes a woven fabric and the second backing member constitutes a woven fabric.

12. A bearing liner as set forth in claim 2 wherein the first backing member constitutes a fibrous material and the second backing member constitutes a fibrous material.

13. A bearing liner as set forth in claim 11 wherein the mixture of the adhesive and the particles in the first plurality extend above the first backing member a distance no greater than approximately 0.0035 inches and the mixture of the adhesive and the particles in the second plurality extend above the second backing member a distance no greater than approximately 0.0035 inches and the particles extending above the second backing member are mechanically bonded in the pores of the first backing member.

14. A bearing liner as set forth in claim 1 wherein the particles in the second plurality infiltrate the first backing member to become mechanically bonded in the pores of the first backing member and provide for a bearing action by the first backing material when the first backing material constitutes the wear surface.

15. A bearing liner as set forth in claim 14 wherein the particles in the first and second pluralities have a size in the order of five (5) microns.

16. A bearing liner as set forth in claim 12 wherein the mixture of the adhesive and the particles in the first plurality extend above the first backing member a distance no greater than approximately 0.0035 inches and the mixture of the adhesive and the particles in the second plurality extend above the second backing member a distance no greater than approximately 0.0035 inches and the particles extending above the second backing member are mechanically bonded in the pores of the first backing member.

17. A bearing liner as set forth in claim 16 wherein the particles constitute a polytetrafluoroethylene.

18. A bearing as defined in claim 3 wherein said backing in said first wear resistant material constitutes a woven fabric and said backing in said compliant material constitutes a woven fabric.

19. A bearing as set forth in claim 3 wherein the particles in the second plurality are mechanically bonded in the pores of the first backing member to provide the first backing member with low friction characteristics at the positions adjacent the second backing member.

20. A bearing liner as set forth in claim 7 wherein the lubricant distributed in the binder in the first wear resistant layer extends above the fibrous material in the first wear resistant layer a distance no greater than approximately 0.0035 inches and the lubricant distributed in the binder in the compliant layer extends above the fibrous material in the compliant layer a distance no greater than approximately 0.0035 inches and the particles extending above the fibrous material in the compliant layer are mechanically locked in the pores of the fibrous material in the first wear resistant layer.

21. A bearing liner as set forth in claim 20 wherein the lubricant in the first wear resistant material constitutes polytetrafluoroethylene with a size in the order of five microns and the lubricant in the compliant material constitutes polytetrafluoroethylene with a size in the order of five microns.

22. A bearing liner as set forth in claim 8 wherein said wear resistant layers are adhered to one another with at least some of the lubricant and binder of each of the intermediate wear resistant layers being mechanically bonded in the pores of the fibrous material in the adjacent wear resistant layers.

23. A bearing liner as defined in claim 9 wherein the porous material in at least one of said wear resistant layers is fibrous.

24. A bearing liner as defined in claim 9 wherein the porous material in each of said wear resistant layers includes a woven fabric and wherein the binder and the lubricant in each wear resistant layer extends above the woven fabric in that layer by a very thin dimension and is mechanically bonded in the pores of the fibrous material of the adjacent wear resistant layer.

25. A bearing liner as defined in claim 8 wherein the porous material in each of said wear resistant layers is fibrous and wherein the binder and the lubricant in each wear resistant layer extends above the porous material in that layer by a very thin dimension and is mechanically bonded in the pores of the fibrous material of the adjacent wear resistant layer and the lubricant constitutes polytetrafluorethylene and constitutes approximately twenty percent to thirty-five percent by weight in the intimate distribution including the binder.

26. A bearing liner as defined in claim 24 wherein the very thin dimension of the binder and the lubricant in each wear resistant layer above the woven fabric in that wear resistant layer is no greater than about 0.0035 inches and the lubricant is polytetrafluorethylene and has a percentage by weight in the intimate distribution with the binder of approximately twenty percent to thirty-five percent by weight.

27. A bearing liner as defined in claim 25 wherein the very thin dimension of the binder and the lubricant in each wear resistant layer above the fibrous material in that layer is no greater than about 0.0035 inches and the lubricant is polytetrafluoroethylene and has a percentage by weight in the intimate distribution with the binder of approximately twenty percent to thirty-five percent by weight.

* * * * *